(12) United States Patent
Meister et al.

(10) Patent No.: US 9,969,441 B2
(45) Date of Patent: May 15, 2018

(54) JOINT FOR VEHICLE COMPONENTS

(71) Applicant: Honda Motor Co., Ltd., Tokyo (JP)

(72) Inventors: J. Nicholas Meister, Columbus, OH (US); Benjamin J. Meaige, Powell, OH (US); Robb L. Augustine, Dublin, OH (US)

(73) Assignee: Honda Motor Co., Ltd., Tokyo (JP)

( * ) Notice: Subject to any disclaimer, the term of this patent is extended or adjusted under 35 U.S.C. 154(b) by 46 days.

(21) Appl. No.: 14/992,289

(22) Filed: Jan. 11, 2016

(65) Prior Publication Data

US 2016/0311473 A1    Oct. 27, 2016

Related U.S. Application Data

(60) Provisional application No. 62/150,670, filed on Apr. 21, 2015.

(51) Int. Cl.
*F16B 11/00* (2006.01)
*B62D 27/02* (2006.01)

(52) U.S. Cl.
CPC .......... *B62D 27/026* (2013.01); *F16B 11/006* (2013.01)

(58) Field of Classification Search
CPC ..................................... F16B 11/006
USPC ........................................ 296/26
See application file for complete search history.

(56) References Cited

U.S. PATENT DOCUMENTS

| 5,089,311 | A | 2/1992 | Ligon |
| 5,554,240 | A | 9/1996 | Toy |
| 6,387,524 | B1 * | 5/2002 | Finefrock ............ C09D 163/08 |
| | | | 220/62.11 |
| 6,474,726 | B1 | 11/2002 | Hanakawa et al. |
| 6,602,611 | B1 * | 8/2003 | Kopp ..................... B32B 7/12 |
| | | | 156/326 |
| 6,846,559 | B2 | 1/2005 | Czaplicki |
| 6,880,657 | B2 | 4/2005 | Schneider et al. |
| 7,182,381 | B2 | 2/2007 | Ogawa et al. |
| 7,422,652 | B2 | 9/2008 | Ondrus et al. |
| 7,761,973 | B2 | 7/2010 | Toback |
| 8,820,824 | B1 | 9/2014 | Hinz et al. |
| 2005/0058787 | A1 | 3/2005 | Ishikawa et al. |
| 2005/0244215 | A1 * | 11/2005 | Prat ...................... F16B 11/006 |
| | | | 403/268 |
| 2006/0276601 | A1 | 12/2006 | Lutz et al. |
| 2007/0265364 | A1 | 11/2007 | Oner-Deliomanli |

(Continued)

FOREIGN PATENT DOCUMENTS

| DE | 102007026762 | 2/2009 |
| DE | 102010008660 A1 * | 9/2010 ........... B62D 27/026 |

(Continued)

*Primary Examiner* — Pinel E Romain
(74) *Attorney, Agent, or Firm* — Honda Patents & Technologies North America, LLC; Mark E. Duell (57) ABSTRACT

A method of joining a first body made of a first material to a second body made of a second material is disclosed. The method includes the steps of placing an adhesive between the first body and second body, moving the first body toward and into contact with the second body with the adhesive between the first body and the second body, pre-curing the adhesive, and curing the first body and second body in an oven. Pre-curing may be done by induction curing along a bonding line, pre-curing adhesive in a low temperature oven, or using a two-part adhesive.

8 Claims, 10 Drawing Sheets

(56) References Cited

U.S. PATENT DOCUMENTS

| | | | |
|---|---|---|---|
| 2008/0149256 A1* | 6/2008 | Wang | B21J 15/025 |
| | | | 156/92 |
| 2008/0296164 A1 | 12/2008 | Ulrich et al. | |
| 2011/0094656 A1 | 4/2011 | Ferrari et al. | |
| 2011/0278802 A1 | 11/2011 | Nitsche et al. | |
| 2012/0183346 A1* | 7/2012 | Khan | B60Q 1/0441 |
| | | | 403/265 |
| 2014/0044478 A1 | 2/2014 | Veilleraud | |
| 2014/0105669 A1 | 4/2014 | Coudron | |
| 2014/0308069 A1 | 10/2014 | Boettcher et al. | |
| 2014/0328614 A1* | 11/2014 | Fleischheuer | B60N 2/682 |
| | | | 403/267 |
| 2015/0096663 A1 | 4/2015 | Siboni et al. | |
| 2015/0129113 A1 | 5/2015 | Griess et al. | |
| 2016/0377108 A1* | 12/2016 | Cloud | F16B 39/225 |
| | | | 411/82.1 |
| 2017/0189994 A1* | 7/2017 | Behr | B23K 26/206 |

FOREIGN PATENT DOCUMENTS

| | | |
|---|---|---|
| EP | 0784088 | 7/1997 |
| JP | H05179213 A | 7/1993 |
| JP | 2011144256 | 7/2011 |
| WO | 2006-128722 A1 | 12/2006 |
| WO | 2010-009936 | 1/2010 |

* cited by examiner

JOINT FOR VEHICLE COMPONENTS

RELATED APPLICATIONS

This application claims priority from U.S. provisional application No. 62/150,670, which is incorporated by reference herein in its entirety.

BACKGROUND

As temperature is applied to a material when a component is traveling through a cure oven, usually to cure an electrodeposition coating or electrostatic paint, the material will expand at a rate proportional the change in temperature. Different materials have different rates at which they expand. If the difference in thermal expansion is great enough between two bonded dissimilar materials, such as steel and aluminum, deformation can occur in either the joined materials or the mechanical joint.

When adhesive is applied to these joints, the thermal expansion difference may also cause failure of the adhesive before it can fully cure to both surfaces. To account for this, adhesive suppliers have formulated adhesives to maintain flexibility during the curing process to account for this thermal expansion difference without failing. The challenge for the adhesive is to maintain enough flexibility to prevent failure when there is thermal expansion difference between the bonded surface, but then to maintain long term durability after cure. Typically increasing flexibility of the adhesive will compromise the shear strength.

APPLICATION SUMMARY

The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the inventive subject matter.

According to one aspect, a method of joining a first body made of a first material to a second body made of a second material is disclosed. The method includes the steps of placing an adhesive between the first body and second body, moving the first body toward and into contact with the second body with the adhesive between the first body and the second body, pre-curing the adhesive, and curing the first body and second body in an oven.

According to another aspect, a vehicle component manufactured by the process of joining a first body made of a first material to a second body made of a second material is disclosed. The process includes the steps of placing an adhesive between the first body and second body, moving the first body toward and into contact with the second body with the adhesive between the first body and the second body, pre-curing the adhesive, and curing the first body and second body in an oven.

According to yet another aspect, a method of partially curing an adhesive is disclosed. The method includes the steps of providing a first body and a second body, the first body and second body to be adhered together, placing the adhesive between the first body and second body, moving the first and second parts into contact, and pre-curing the adhesive.

The figures depict various embodiments of the embodiments for purposes of illustration only. One skilled in the art will readily recognize from the following discussion that alternative embodiments of the structures and methods illustrated herein may be employed without departing from the principles of the embodiments described herein.

DETAILED DESCRIPTION

The apparatuses and methods disclosed in this document are described in detail by way of examples and with reference to the figures. It will be appreciated that modifications to disclosed and described examples, arrangements, configurations, components, elements, apparatuses, methods, etc. can be made and may be desired for a specific application. In this disclosure, any identification of specific techniques, arrangements, etc. are either related to a specific example presented or are merely a general description of such a technique, arrangement, etc. Identifications of specific details or examples are not intended to be, and should not be, construed as mandatory or limiting unless specifically designated as such. Selected examples of expandable adhesives for joining two vehicle components are hereinafter disclosed and described in detail with reference made to FIGS. 1-7.

Two structural components of the vehicle can be coupled or joined together by forming a joint between the two structural components. The structural components can be joined together rigidly or can be joined together so as to permit relative motion between the two structural components. A vehicle, such as an automobile, can include a body that can be substantially supported by a frame, where the body can include a number of panels such as body panels and a hood.

Figure 1:
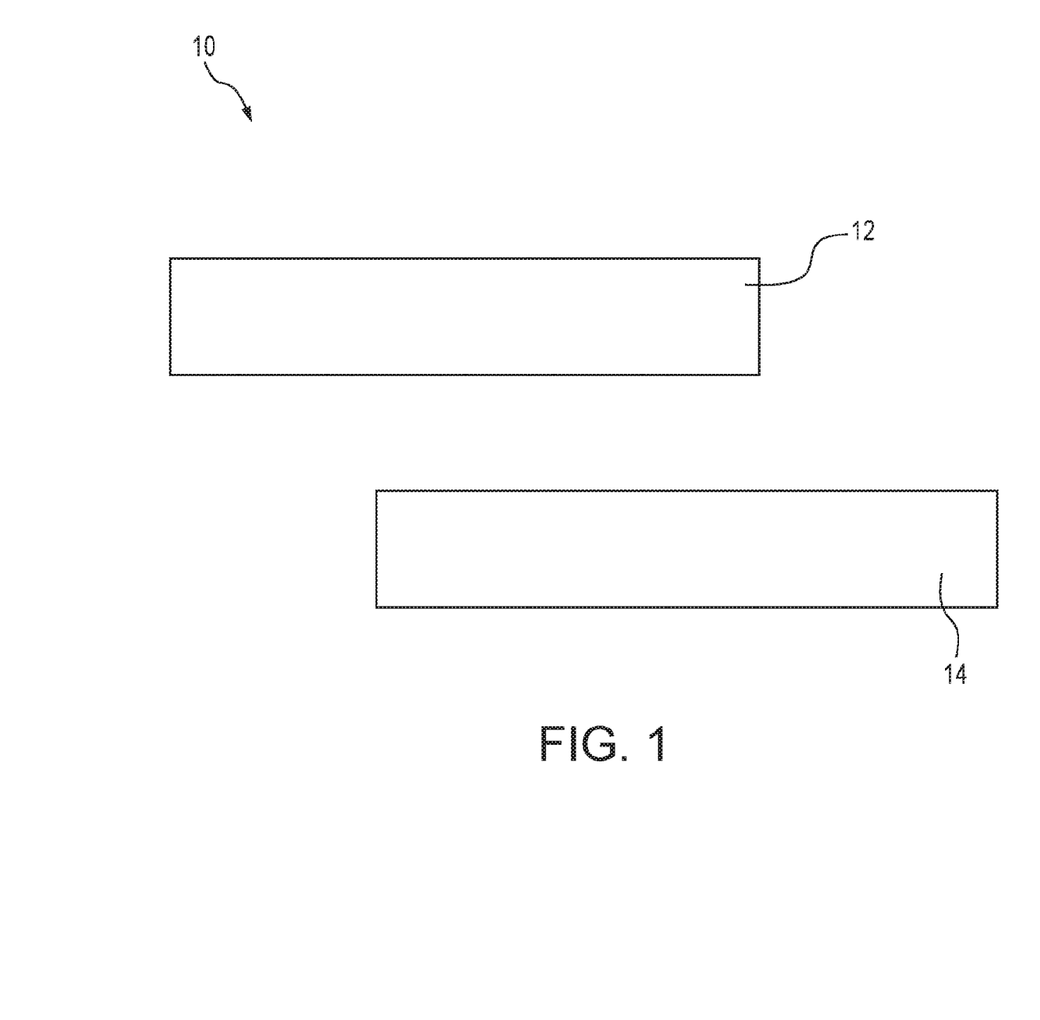
FIG. 1 is schematic representation of a joint joining two dissimilar materials.
Figure 2:
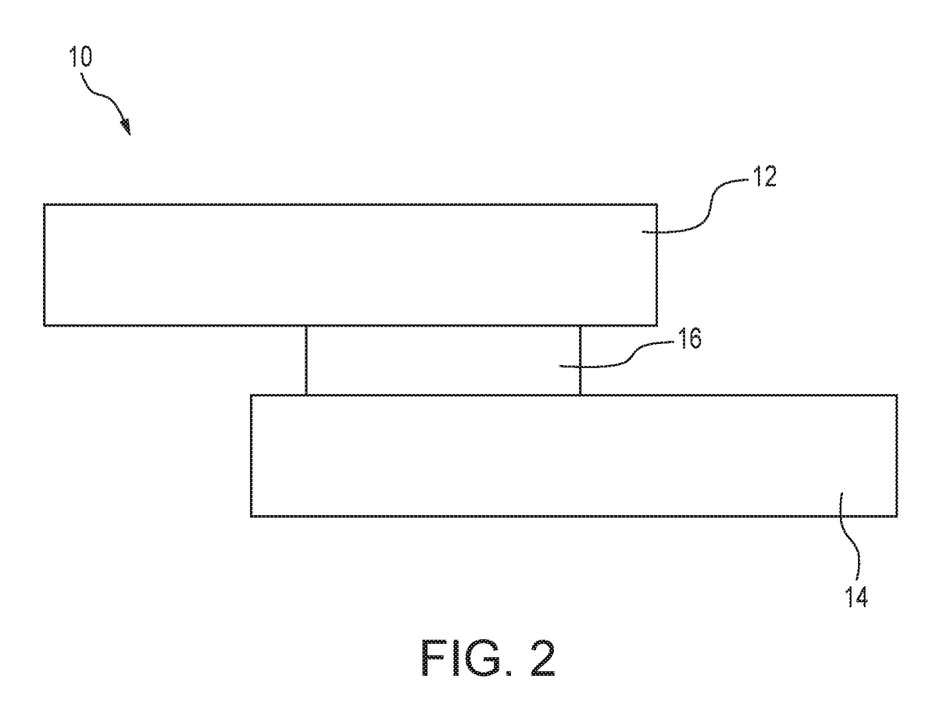
FIG. 2 is schematic representation of a joint joining two dissimilar materials with an adhesive.
Figure 3:
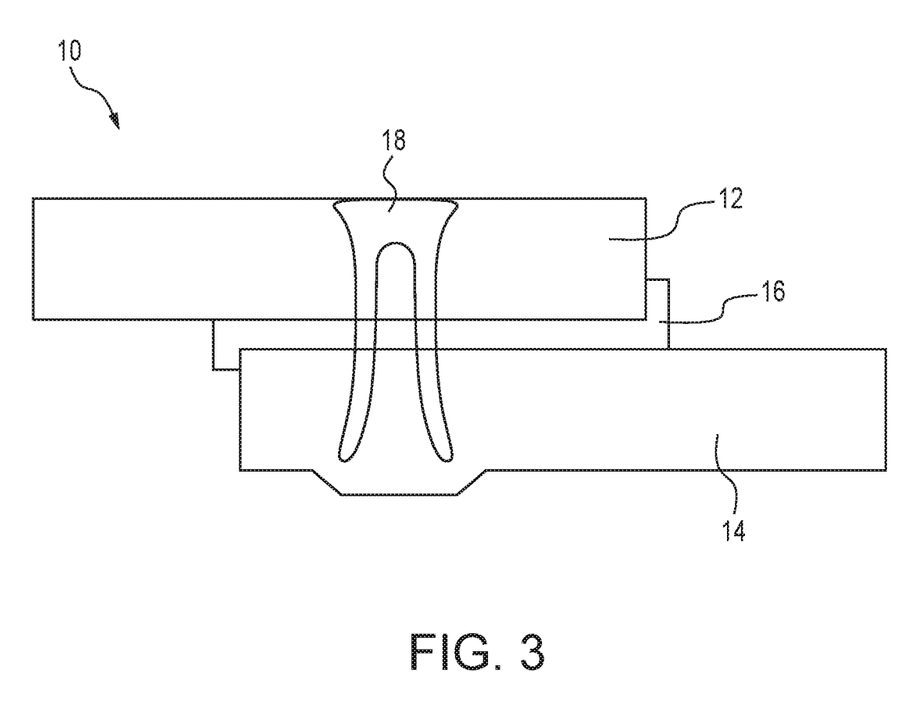
FIG. 3 is schematic representation of an alternate embodiment joint joining two dissimilar materials with an adhesive.

In one example, schematically illustrated in FIGS. 1-3, a joint 10 can be formed between a first body 12 and a second body 14 with an adhesive 16 positioned between the first body 12 and the second body 14. In one example, the first body 12 can be a hood panel and the second body 14 can be a body panel. In another example, the first and second bodies 12, 14 can be respective outer and inner panels of a rocker panel assembly. However, it will be understood that a joint can be formed from any of a variety of other vehicular components or other bodies in any of a variety of suitable configurations. As illustrated in FIG. 1, in preparation for forming the joint 10, the first body 12 and the second body 14 can be placed adjacent to one another. As illustrated in FIG. 2, an adhesive 16 can be placed between the first body 12 and the second body 14, and the first body 12 and the second body 14 can be moved towards one another so that the adhesive 16 comes into contact with both the first body 12 and the second body 14.

As illustrated in FIG. 3, a fastener 18 can be inserted through the first body 12, second body 14, and adhesive 16 to form the joint 10. The fastener 18 can be inserted in a manner that facilitates a sustained connection between the first body 12 and second body 14. In one example, the fastener 18 can be a rivet, but it will be understood that a fastener can be any of a variety of other types of suitable mechanical fasteners. The process of inserting the fastener 18 can apply a pressure such that the first body 12 and the second body 14 progressively move toward one another. Such movement of the first body 12 and the second body 14 can apply pressure on the adhesive 16 and result in the adhesive 16 flowing so as to move toward and past the edges of the first body 12 and second body 14, as illustrated in FIG. 3.

In another example, a joint can be formed without a fastener 18. A temporary apparatus such as a clamp can be used to secure the first body 12 and second body 14 in relative position until the adhesive 16 is cured. Or the adhesive 16 can be at least partially cured early in the joint formation process so that the fastener 18 is not needed.

As will be described below, the adhesive 16 can be arranged to provide a number of features or functions for the joint 10. For example, the adhesive 16 can be arranged to be expandable when exposed to heat. Such an expandable adhesive 16 can spread along surfaces of the first body 12 and second body 14 so as to cover and protect surfaces that are otherwise uncoated and/or exposed. In another example, the adhesive 16 can include properties that upon partial curing of the adhesive 16 will secure the first body 12 and second body 14 in a proper relative alignment to accommodate additional processing steps of forming the joint 10 such as applying corrosive prevention layers or applying paint layers. In another example, the adhesive 16 can include insulating properties so that the first body 12 is insulated from the second body 14 so as to inhibit galvanic corrosion.

Vehicle components such as body panels, hood panels, and other such components can be formed, for example, from a metal or metal alloy or another material, such as plastic or fiberglass. It will be understood that vehicle components can be formed from any of a variety of suitable materials. Thus, in certain examples, a joint can include a first body and a second body that are formed from similar or dissimilar materials. In one example, dissimilar materials can be used by forming the first body 12 of the joint 10 from steel, and forming the second body 14 of the joint 10 from aluminum. In such an example, the first body 12 and the second body 14 can have different physical and/or mechanical properties. In one example, the first body 12 and the second body 14 can have different coefficients of linear thermal expansion.

When the materials are dissimilar, the joint 10 can be arranged such that the arrangement provides protection to the first body 12 and second body 14 against galvanic corrosion when the first body 12 and second body 14 come into contact with an electrolyte such as dissolved road salt. One arrangement that can offer protection against galvanic corrosion is the positioning of the adhesive 16 between the first body 12 and second body 14. Such positioning of the adhesive 16 can provide physical separation between the first body 12 and the second body 14. As described above, when the joint 10 is formed, the movement of the first body 12 toward the second body 14 can result in the adhesive 16 flowing so as to move toward and past the edges of the joint 10 to form a separation layer between the first body 12 and the second body 14. Furthermore, when the adhesive 16 is formed so that it functions as an insulator, the adhesive 16 can facilitate isolation of the galvanic potential between the first body 12 and the second body 14. Thus, the first body 12 and the second body 14 can be isolated and insulated by the adhesive 16 within a framework of the joint 10.

In addition to protection provided by the adhesive 16, the joint 10 can be coated with a corrosion prevention layer. The corrosion prevention layer can be an epoxy-based coating. In one example, the coating can be applied by an electrodeposition coating process, also known as e-coating. In such example, e-coating can include any of a variety of suitable methods for e-coating, any of which can be used to apply a corrosion preventing layer to a joint 10.

Figure 4:
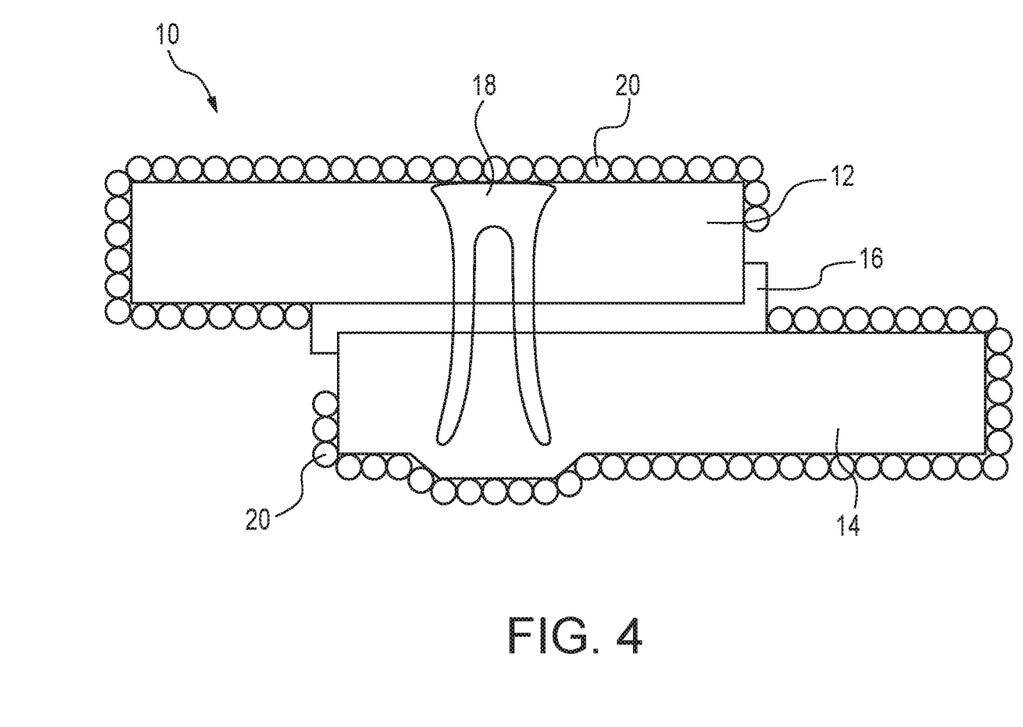
FIG. 4 is schematic representation of an alternate embodiment joint joining two dissimilar materials with an adhesive.

E-coating can be preceded by cleaning and/or treating the exposed surfaces of the first body 12 and the second body 14, which can provide sufficient phosphatability to facilitate proper coating formation. As illustrated in FIG. 4, a surface conditioner 20 can be applied to the exposed surfaces of the first body 12 and the second body 14 to facilitate the coating of the joint 10. Generally, e-coating can include submerging the joint 10 into an electrodeposition bath in an e-coating tank, which can include, a binder resin, a synthetic resin, and optionally, a pigment and other additives dissolved or dispersed in a solvent. In an example, an epoxy resin can be used, along with any of a variety of other suitable resins.

Figure 5:
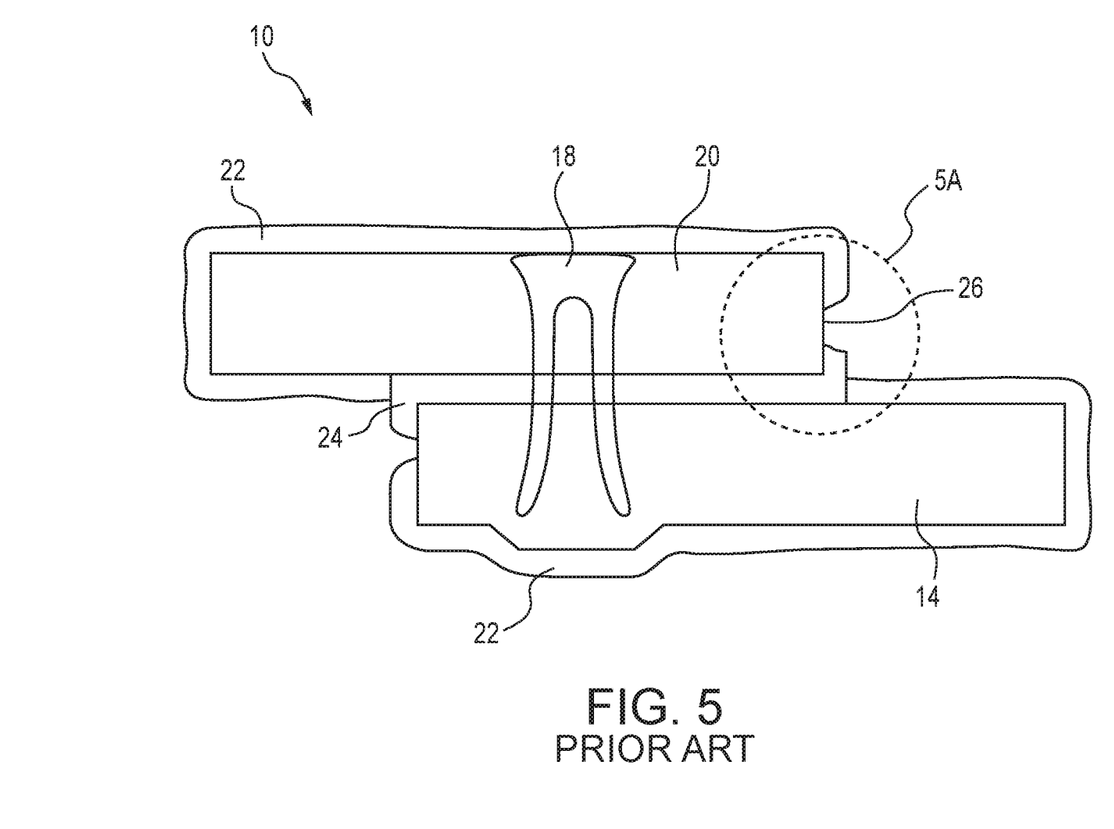
FIG. 5 is schematic representation of a prior art embodiment joint joining two dissimilar materials with an adhesive.
Figure 6:
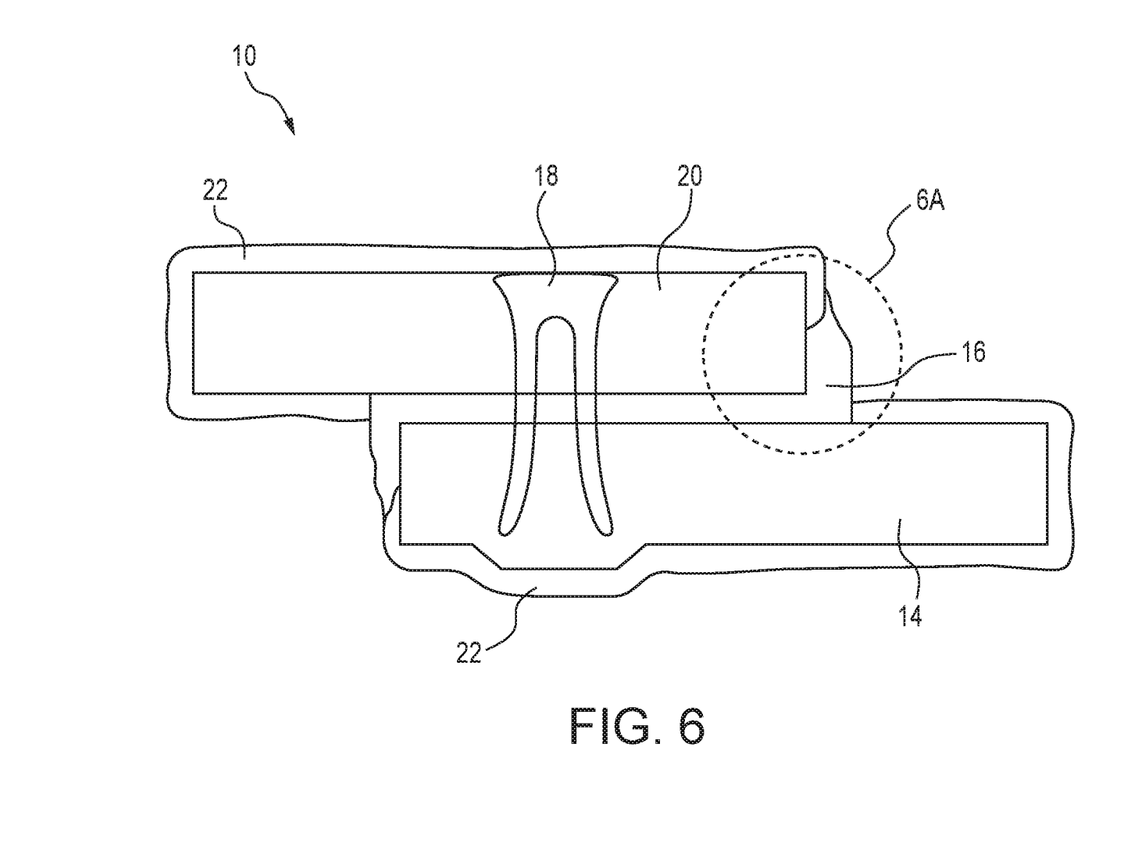
FIG. 6 is schematic representation of an alternate embodiment joint joining two dissimilar materials with an adhesive.

Upon immersion into the e-coating tank, the joint 10 can come into contact with electrodes such that a voltage can be applied between the cathode and an anode to provide current through the electrodeposition bath resulting in the application of a protective coating 22 on the joint 10. Such a protective coating 22 is illustrated in FIGS. 5 and 6. In one example, the joint 10 can undergo electrodeposition one or more times, and in some embodiments, the joint 10 can be washed between coatings, post-coating, or both.

Figure 5A:
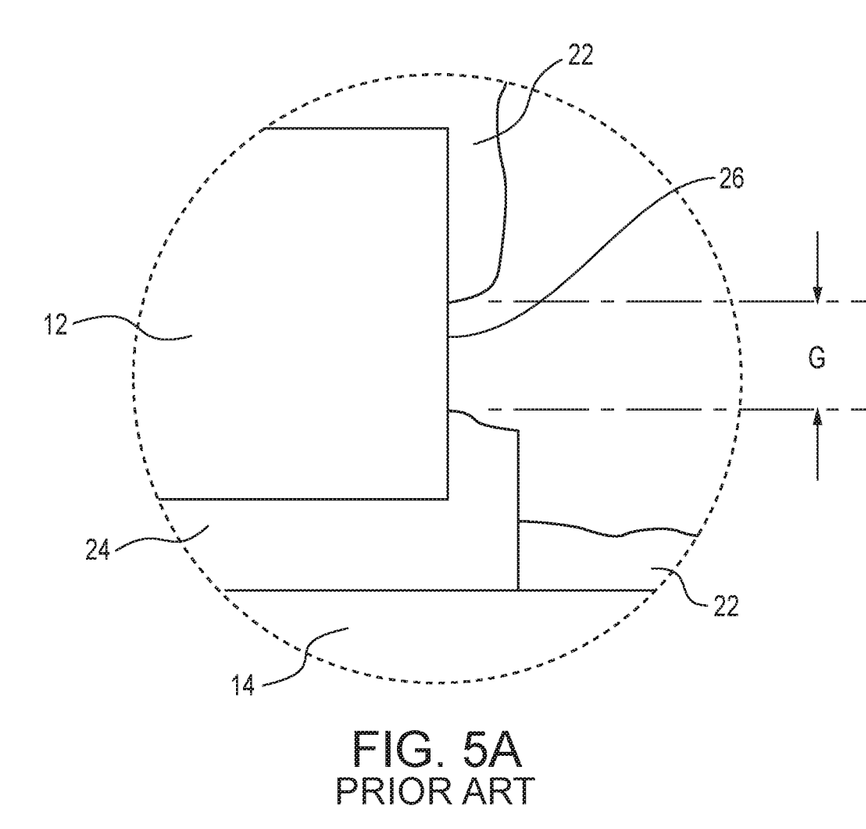
FIG. 5a is close-up schematic representation of a portion of the FIG. 5 prior art embodiment joint joining two dissimilar materials with an adhesive.

When the process of applying a protective coating 22 as described herein is performed with prior art adhesives 24, portions of the first body 12 and second body 14 can remain unprotected after the protective coating 22 has been applied to the joint 10. As illustrated in FIGS. 5 and 5A, the use of a prior art adhesive can result in the first body 12 including an unprotected section 26. In one example, as will be described below, the joint 10 undergoes one or more heating processes during the application of the protective coating 22 and any subsequent applications of paint. Some prior art adhesives 24 can shrink during heating processes. As illustrated in FIG. 5A, such shrinkage can result in a gap G between the prior art adhesive 24 and the protective coating 22 that exposes a section 26 of the first body 12 to potential corrosion. As is also illustrated in FIGS. 5 and 5A, the second body 14 can include a similar exposed section. The exposed section 26 can result in corrosion of the joint 10. In another example, if the surface conditioner 20 is not effective at the interface of the first body 12 and second body 14, a similar gap G can result and a section 26 of the first body can be exposed.

Figure 6A:
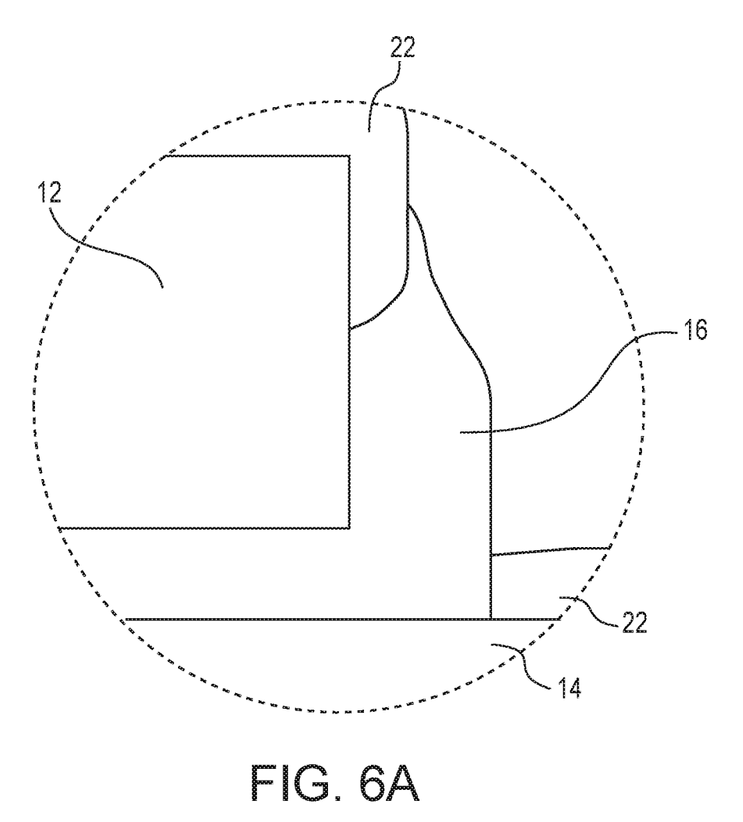
FIG. 6a is close-up schematic representation of a portion of the FIG. 6 embodiment joint joining two dissimilar materials with an adhesive.

The adhesive 16 can be an expandable adhesive, and in certain examples, partial curing can cause the adhesive 16 to expand to cover the exposed section 26 of the first body 12 as illustrated in FIGS. 6 and 6A. In other examples, the adhesive 16 can be expandable upon fully curing. The adhesive 16 can also expand to cover the exposed section of the second body 14. In certain arrangements, such as a rocker panel assembly, expansion of the adhesive 16 can extend over sections of an interior that might otherwise remain exposed using the prior art adhesives. When the interior is then e-coated, the e-coating can be more complete and thus enhance the overall integrity of the rocker panel assembly. An example of the effects of the expandable adhesive is shown in Appendix A.

In some examples, partial curing can be effected by one or more chemical processes and/or preliminary and localized heating of the adhesive 16 such that any effects of thermal expansion of the first body 12 and/or second body 14 can be minimized. In one embodiment, the adhesive 16 can be partially cured with an induction cure of the bond line (e.g., localized heating) prior to introduction into an e-coating oven (for curing the e-coat). In another embodiment, the adhesive 16 can be partially cured by passing the joint 10 through a "pre-cure" oven that prior to the e-coat oven. The pre-cure oven can be smaller than, and operate at a lower temperature than, the e-coating oven. In yet another embodiment, the adhesive 16 can be partially cured by incorporating a secondary chemical reaction into the adhesive formulation that achieves some initial strength buildup prior to introduction into the e-coating oven. However, it will be appreciated that any of a variety of suitable methods can be employed alone or in combination with other methods to effect sufficient partial curing of an adhesive.

In one example, the adhesive can be an adhesive as described and disclosed in WIPO Patent Application WO/2006/128722, entitled Toughened Epoxy Adhesive Composition, and filed on Jun. 2, 2006, which is incorporated herein by reference. In another example, the adhesive can be the adhesive described and disclosed in WIPO Patent Application WO/2006/128722 and further including a foaming agent.

After the protective coating 22 is formed, the protective coating 22 can be cured by baking the joint 10 in an oven. In certain examples, the oven can be heated to about 150° C. or greater; in other examples, the oven can be heated to about 180° C. or greater; and in other embodiments, the oven can be heated to about 195° C. or greater.

The joint 10 can be arranged to rely on the adhesive 16 to facilitate maintaining an alignment of the first body 12 and the second body 14. In such embodiments where the first body 12 and the second body 14 are formed from dissimilar materials, the properties of the materials can be considered. For example, dissimilar materials, such as steel and aluminum, can expand at different rates when heated to temperatures associated with the e-coat bake (i.e., first body 12 and the second body 14 can include different coefficients of linear thermal expansion). Uneven expansion during thermal loading as well as uneven contraction during thermal relaxation can create stress on the joint 10 and particularly on the adhesive 16 when the adhesive 16 is fully cured thus causing the adhesive to undergo plastic deformation or failure which can result in poor long term durability and/or performance. To account for this, the adhesive 16 applied to the joint 10 can be partially cured prior to the e-coat bake to fix the first body 12 with respect to the second body 14 before coating the joint 10. Such an arrangement can facilitate maintaining functionality of the adhesive 16 through an e-coat process. The adhesive 16 can be partially cured such that it can facilitate sustaining the connection between the first body 12 and the second body 14 during the e-coat and can retain sufficient flexibility to endure the uneven thermal expansion of the first body 12 and the second body 14 (i.e., distribute stress) during the subsequent e-coat bake. Thus, the adhesive 16 can cooperate with the first body 12 and second body 14 to maintain alignment through both the coating and subsequent baking of the joint 10 after partially curing the adhesive 16. In certain examples, the adhesive 16 can be fully cured in the oven, along with the coating 20, during the e-coat bake.

Thus, in certain examples, the joint 10 can include an adhesive 16 that can be effective where the first body 12 has a first coefficient of linear thermal expansion and the second body 14 has a second coefficient of linear thermal expansion, such that the first and second coefficients of linear thermal expansion are different. In one example, when partially cured, the adhesive 16 can withstand a pressure of 10 MPa.

The adhesive 16 can undergo the expansion described herein while fully curing in the oven during the e-coat bake. In one example, in arrangements where the adhesive 16 expands during partial curing, the adhesive 16 can undergo additional expansion while fully curing.

In some example, a foaming agent can be combined with a base resin composition to provide an adhesive with a desired expanding effect. It will be appreciated that a joint can include any of a variety of suitable adhesives, foaming agents, and combinations thereof such that sufficient expansion can be affected to provide desired protection.

Figure 8:
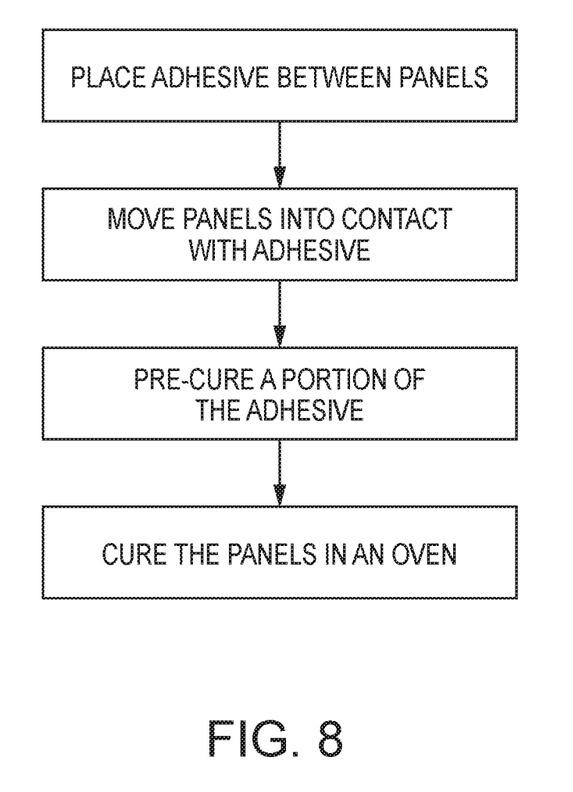
FIG. 8 is a flowchart illustrating an embodiment of a process for joining two dissimilar materials.

According to one example, which is generally illustrated in the flowchart in FIG. 8, a method of making a joint 10 can include providing the joint 10 including the first body 12, the second body 14, and the expandable adhesive 16 therebetween. The method can further include coating the joint 10 and expanding the adhesive 16 to cover at least a portion of the coating 20 on each of the first and second bodies 12, 14. In some embodiments, the method can further include partially curing the adhesive 16 to fix the first body 12 with respect to the second body 14. And in such embodiments, the method can further include fully curing the adhesive 16 by baking the joint 10 in an oven, wherein the adhesive 16 can expand to cover at least a portion of the coating 22 on each of the first and second bodies 12, 14 and the adhesive 16 can cooperate with the first and second bodies 12, 14 to maintain an alignment of the joint 10 established during partially curing the adhesive 16.

Figure 7:
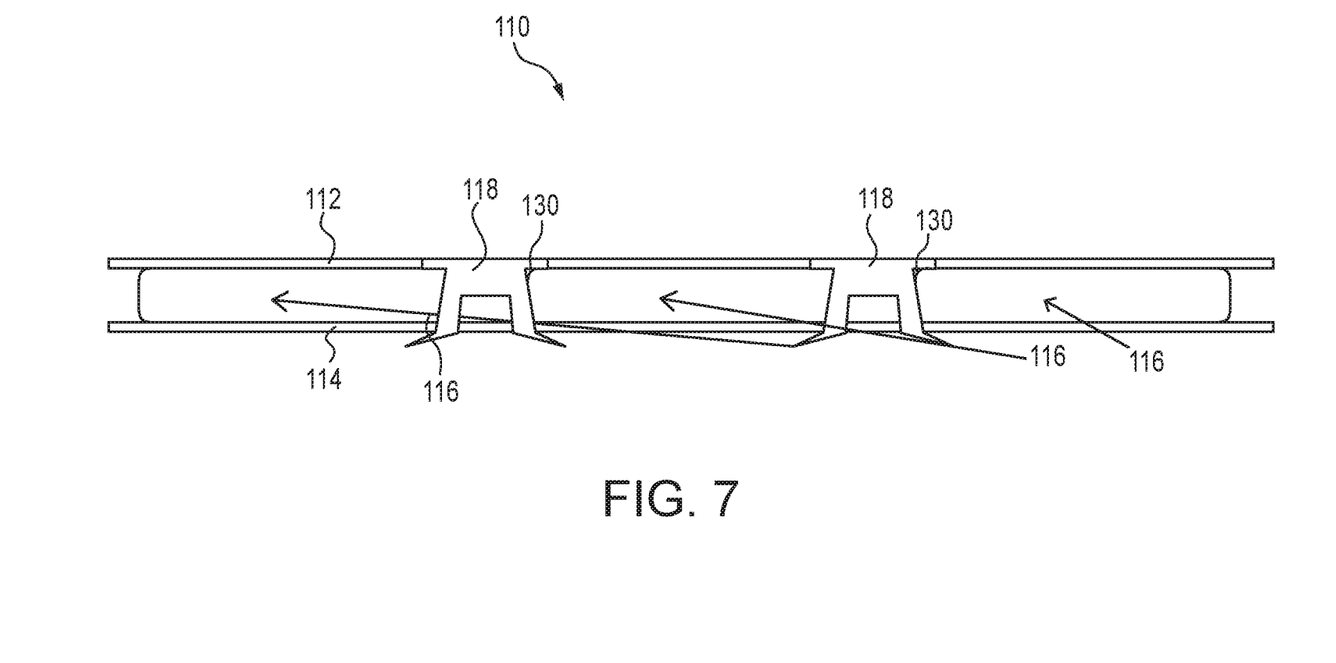
FIG. 7 is schematic representation of an alternate embodiment joint joining two dissimilar materials with an adhesive.

FIG. 7 illustrates a panel 110 according to another embodiment. The joint 110 can be similar to, or the same in many respects as, the joint 10 of FIGS. 1-6. For example, the joint 110 can include a first body 112, a second body 114, an adhesive 116, and a plurality of fasteners 118. The adhesive 116 can be positioned between the first body 112 and the second body 114. The fastener 118 can be inserted through the first body 112, the second body 114, and the adhesive 116 to form the joint 110. However, during manufacture of the joint 110, the adhesive 116 can be deposited onto the first body 112 or the second body 114 in segments that are spaced from each other (e.g., a stitch bead application) such that the adhesive 116 defines a plurality of gaps 130. Each of the fasteners 118 can extend through respective ones of the gaps 130 to prevent interference between the adhesive 116 and the fasteners 118.

Reference in the specification to "one embodiment" or to "an embodiment" means that a particular feature, structure, or characteristic described in connection with the embodiments is included in at least one embodiment. The appearances of the phrase "in one embodiment" or "an embodiment" in various places in the specification are not necessarily all referring to the same embodiment.

In addition, the language used in the specification has been principally selected for readability and instructional purposes, and may not have been selected to delineate or circumscribe the inventive subject matter. Accordingly, the disclosure of the embodiments is intended to be illustrative, but not limiting, of the scope of the embodiments, which is set forth in the claims.

While particular embodiments and applications have been illustrated and described herein, it is to be understood that the embodiments are not limited to the precise construction and components disclosed herein and that various modifications, changes, and variations may be made in the arrangement, operation, and details of the methods and apparatuses of the embodiments without departing from the spirit and scope of the embodiments as defined in the appended claims.

What is claimed is:

1. A method of joining a hood panel made of a first material to a body panel made of a second material, comprising the steps of:
    placing an adhesive between the hood panel and body panel;
    moving the hood panel toward and into contact with the body panel with the adhesive between the hood panel and the body panel;
    pre-curing a portion of the adhesive by induction curing the adhesive along a bond line where the adhesive contacts the hood panel and the body panel; and
    curing the hood panel and body panel in an oven.

2. The method of claim 1 wherein the step of pre-curing the adhesive comprises the steps of:
    incorporating a pre-cure adhesive into the adhesive; and
    wherein the pre-cure adhesive provides sufficient bonding strength to adhere the hood panel and the second body together during the curing step.

3. The method of claim 1 wherein the first material is aluminum and the second material is steel.

4. A method of partially curing an adhesive comprising the steps of:
    providing a first body and a second body, the first body and second body to be adhered together;
    placing the adhesive between the first body and second body;
    moving the first and second parts into contact;
    incorporating a pre-cure adhesive into the adhesive, wherein the pre-cure adhesive adhered the first body and the second body together during the curing step.

5. The method of claim 4 wherein the step of pre-curing the adhesive comprises the steps of:
    induction curing the adhesive along a bond line where the adhesive contacts the first body and the second body.

6. The method of claim 4 wherein the step of pre-curing the adhesive comprises the steps of:
    passing the adhesive, the first body, and the second body through a pre-cure oven to partially cure the adhesive.

7. The method of claim 4 wherein the pre-cure adhesive and the adhesive are a two-part epoxy adhesive.

8. A method of joining a first body made of a first material to a second body made of a second material, comprising the steps of:
    incorporating a pre-cure adhesive into an adhesive to form a two-part epoxy adhesive;
    placing two-part epoxy adhesive between the first body and second body;
    moving the first body toward and into contact with the second body with the two-part epoxy adhesive between the first body and the second body;
    pre-curing the pre-cure adhesive in the two-part epoxy adhesive to adhere the first body and the second body together; and
    curing the adhesive, the first body, and the second body in an oven.

* * * * *